United States Patent [19]

Huhman et al.

[11] 4,400,930
[45] Aug. 30, 1983

[54] HARVESTER THRESHING ROTOR DRIVE HAVING VARIABLE SPEED BELT DRIVE AND CLUTCHING MEANS

[75] Inventors: Michael L. Huhman, Kansas City, Mo.; Larry R. James, Olathe, Kans.

[73] Assignee: Allis-Chalmers Corporation, Milwaukee, Wis.

[21] Appl. No.: 376,397

[22] Filed: May 10, 1982

[51] Int. Cl.³ .................. A01D 41/12; A01F 12/56
[52] U.S. Cl. .................. 56/11.6; 56/10.3; 56/11.1; 474/19; 474/70
[58] Field of Search .............. 56/10.3, 11.1, 11.4, 56/11.5, 11.6, 11.7, DIG. 15; 130/27 H, 27 R; 192/0.032, 0.034, 56 R; 474/17, 19, 28, 70

[56] References Cited

U.S. PATENT DOCUMENTS

| | | | |
|---|---|---|---|
| 2,697,319 | 12/1954 | Porter | 56/13.6 |
| 3,138,908 | 6/1964 | Budzich | 56/11.1 |
| 3,145,584 | 8/1964 | Fairbank et al. | 56/11.1 |
| 3,242,657 | 3/1966 | Larsen et al. | 56/11.6 |
| 3,481,122 | 12/1969 | Pool et al. | 56/11.1 |
| 4,091,602 | 5/1978 | Williams et al. | 56/11.1 |
| 4,160,456 | 7/1979 | Hawkins et al. | 130/27 T |
| 4,173,155 | 11/1979 | Togami et al. | 74/230.17 M |
| 4,191,006 | 3/1980 | Kerber et al. | 56/11.6 |
| 4,321,991 | 3/1982 | Teijido et al. | 56/10.3 |
| 4,327,544 | 5/1982 | McDuffie et al. | 56/11.1 |
| 4,332,127 | 6/1982 | Staiert et al. | 130/27 H |

FOREIGN PATENT DOCUMENTS

| | | | |
|---|---|---|---|
| 1935594 | 7/1970 | Fed. Rep. of Germany | 56/11.6 |
| 2056836 | 3/1981 | United Kingdom | 56/13.6 |

*Primary Examiner*—Robert A. Hafer
*Assistant Examiner*—David Tarnoff
*Attorney, Agent, or Firm*—Charles L. Schwab

[57] ABSTRACT

A harvester in the form of a self-propelled combine (11) has a crop header (24) and conveying means (31, 32) feeding crop material to a threshing rotor (34). The speed of rotation of the rotor (34) is adjustable by changing the speed of a variable speed belt drive (50) in the drive train from an engine (16) to the threshing rotor (34). The variable speed belt drive (50) is of a type whose speed ratio cannot be changed unless it is running. A special rotor clutch (71) is interposed between the variable speed belt drive (50) and the threshing rotor (34) to permit the variable speed drive to be disconnected from the threshing rotor. Thus, when the rotor (34) stops rotating because of excess crop material, the rotor clutch (71) may be operated to break the power train between the variable speed belt drive (50) and the threshing rotor (34) and the variable speed belt drive (50) may be run and adjusted to a lower output speed. Upon reengagement of the rotor clutch (71), a higher torque can be delivered to the threshing rotor (34), thus, greatly increasing the probability of turning the rotor (34) to overcome the crop material jam.

4 Claims, 5 Drawing Figures

HARVESTER THRESHING ROTOR DRIVE HAVING VARIABLE SPEED BELT DRIVE AND CLUTCHING MEANS

BACKGROUND OF THE INVENTION

1. Technical Field

This invention relates to means for driving the threshing rotor of an agricultural harvester.

2. Prior Art

A self-propelled combine normally has a single internal combustion engine which powers both the traction wheels and the various components of the combine for processing the crop material to separate the seed or grain therefrom. In some combines, a gear-type change-speed transmission is utilized to drive the combine rotor. When the rotor jams, the gear transmission is shifted to a low output speed to supply greater torque to the rotor. In other prior art combines, the power train to the threshing rotor has included a variable speed belt drive whose speed ratio is adjustable, only while running, to change the rotational speed of the rotor. The variable speed belt drive utilizes driving and driven sheaves each having a pair of sheave halves which can be moved relative to one another to change their effective diameter. One of the sheaves is normally spring loaded toward its maximum effective diameter and the effective diameter of the other sheave is normally adjusted by power means such as a hydraulic actuator. When the sheaves are not rotating and the belt is not running, it is not possible to change the speed ratio of the variable speed belt drive. Thus, when the threshing rotor jammed, the variable speed belt drive could not be changed to a lower output speed to transmit more torque to the rotor and perhaps free the rotor.

BRIEF DESCRIPTION OF THE INVENTION

An object of the present invention is to provide a means to selectively interrupt the power train between a variable speed belt drive and the threshing rotor of a harvester processor so as to permit the speed ratio of the variable speed belt drive to be changed when the rotor is stopped, as when an excessive amount of crop material enters the processor.

This invention finds particular utility in a combine harvester of the type having a header, a threshing rotor and conveying means for moving crop material from the header to the rotor. The harvester includes an engine and a power train between the engine and the rotor which includes a variable speed belt drive of the type having variable pitch driving and driven sheaves, which cannot be adjusted to change the speed ratio unless the drive is running. This invention provides a belt drive between the driven shaft of the variable speed belt drive and the rotor and a belt idler clutch pulley cooperating with the belt of the belt drive to effect belt tensioning and clutching. The combined belt idler clutch and tensioning device is controlled by the operator through a control means which may include a hydraulic actuator for moving the belt idler clutch between its belt tensioning position and a belt slip or drive disengaging position. When the rotor is jammed by excess crop material so that the engine is not capable of turning it, the belt idler clutch can be shifted, by the operating controls at his station, to a belt relaxed or slipping position, thereby permitting the clutched belt to slip on its pulleys as the variable speed belt drive is run and adjusted to a reduced output speed condition. Upon reengaging the belt drive by moving the belt idler clutch to its belt tensioning position, increased torque is applied to the rotor to increase its capability of moving the crop material through the processor. The controls for changing the speed ratio of the variable speed belt drive are also located at the operator's station; thus, permitting the opertor to attempt to relieve the jamming of the rotor without his having to leave the operator station. The increased torque is often sufficient to relieve the jammed condition of the rotor thus saving considerable time and work as compared to manually removing the jammed material.

BRIEF DESCRIPTION OF THE DRAWINGS

One embodiment of the invention is illustrated in the drawings in which.

DETAILED DESCRIPTION OF THE DRAWINGS

Figure 1:
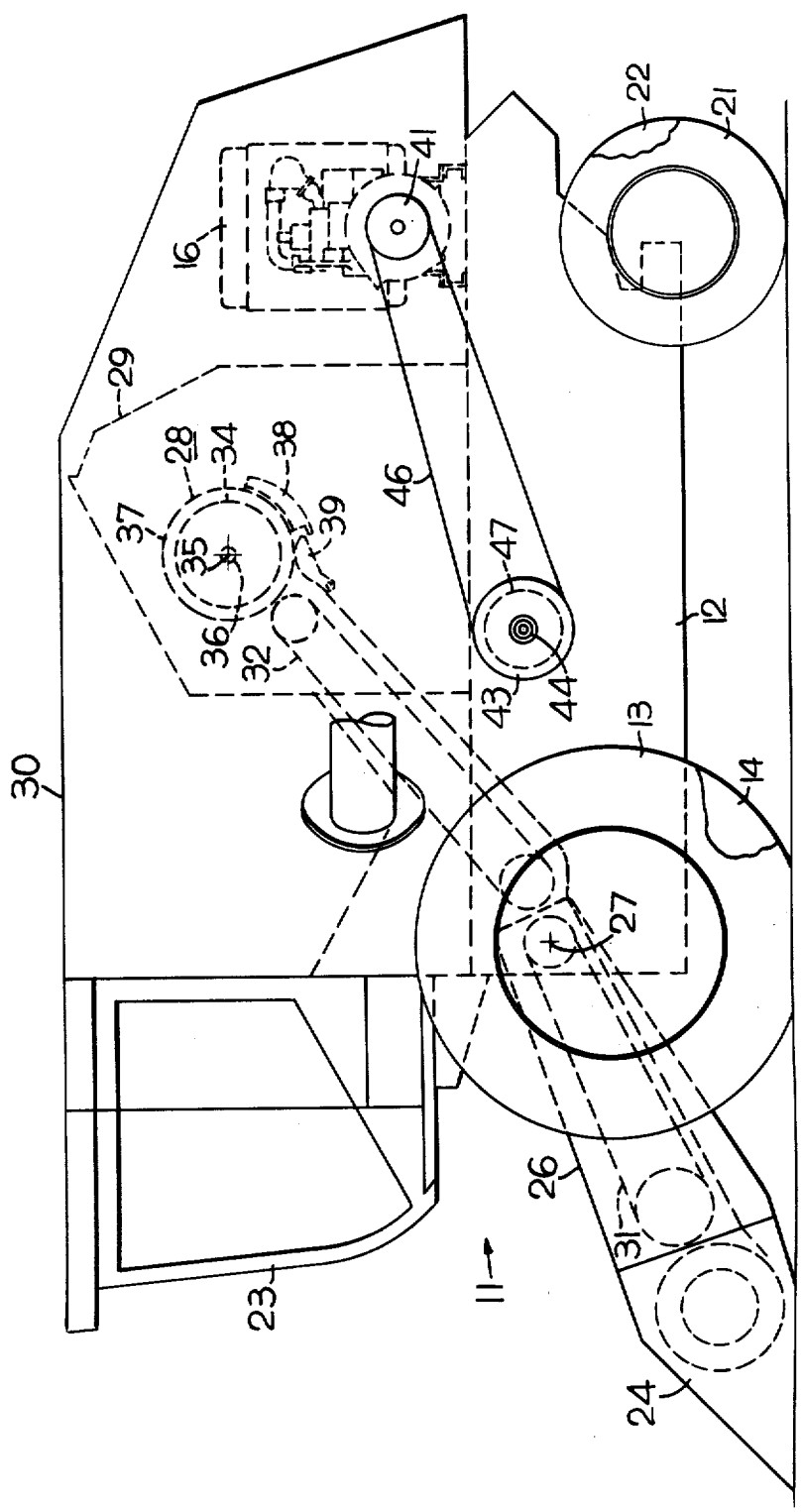
FIG. 1 is a left-hand side view of a combine in which the present invention is incorporated.

As shown in FIG. 1, the combine 11, in which the present invention is incorporated, includes a main frame 12 having a pair of drive wheels 13, 14 at its front end which are driven by an engine 16 through a power train (not shown). A pair of steerable rear wheels 21, 22 support the rear of the main frame 12 and an operator's station or cab 23 is mounted on the front of the main frame 12 between the drive wheels 13, 14 in an elevated position above the header 24 and the feeder housing 26. The front end of the feeder housing 26 is secured to the header 24 and its rear end is pivotally connected to the main frame 12 for vertical swinging movement about a horizontal transverse axis 27. A crop processor 28 is positioned in a housing 29 behind a grain bin 30 and receives crop material from the lower feeder conveyor 31 by way of an upper feeder conveyor 32. The processor 28 includes a threshing rotor 34 which rotates about the transverse axis 35 of its shaft 36 within a perforated cage 37 having a concave 38 and rock door 39. The engine 16 drives a belt pulley 41 and a belt pulley 43 is driven by the pulley 41 through an endless belt 46. The pulley 43 is connected to a transverse shaft 44 by an electric clutch 47.

Figure 2:
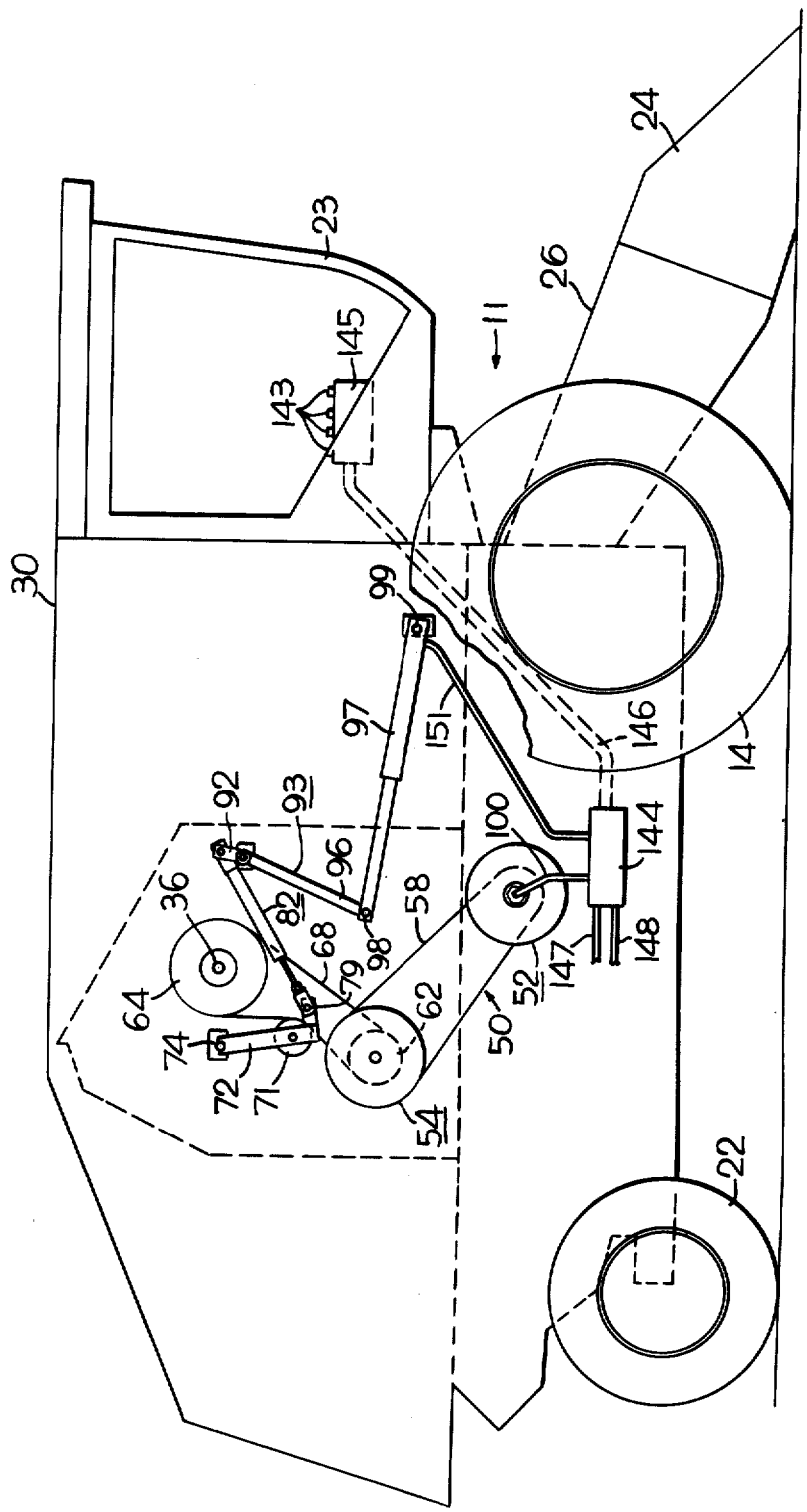
FIG. 2 is a right-hand side view of the combine shown in FIG. 1.
Figure 3:
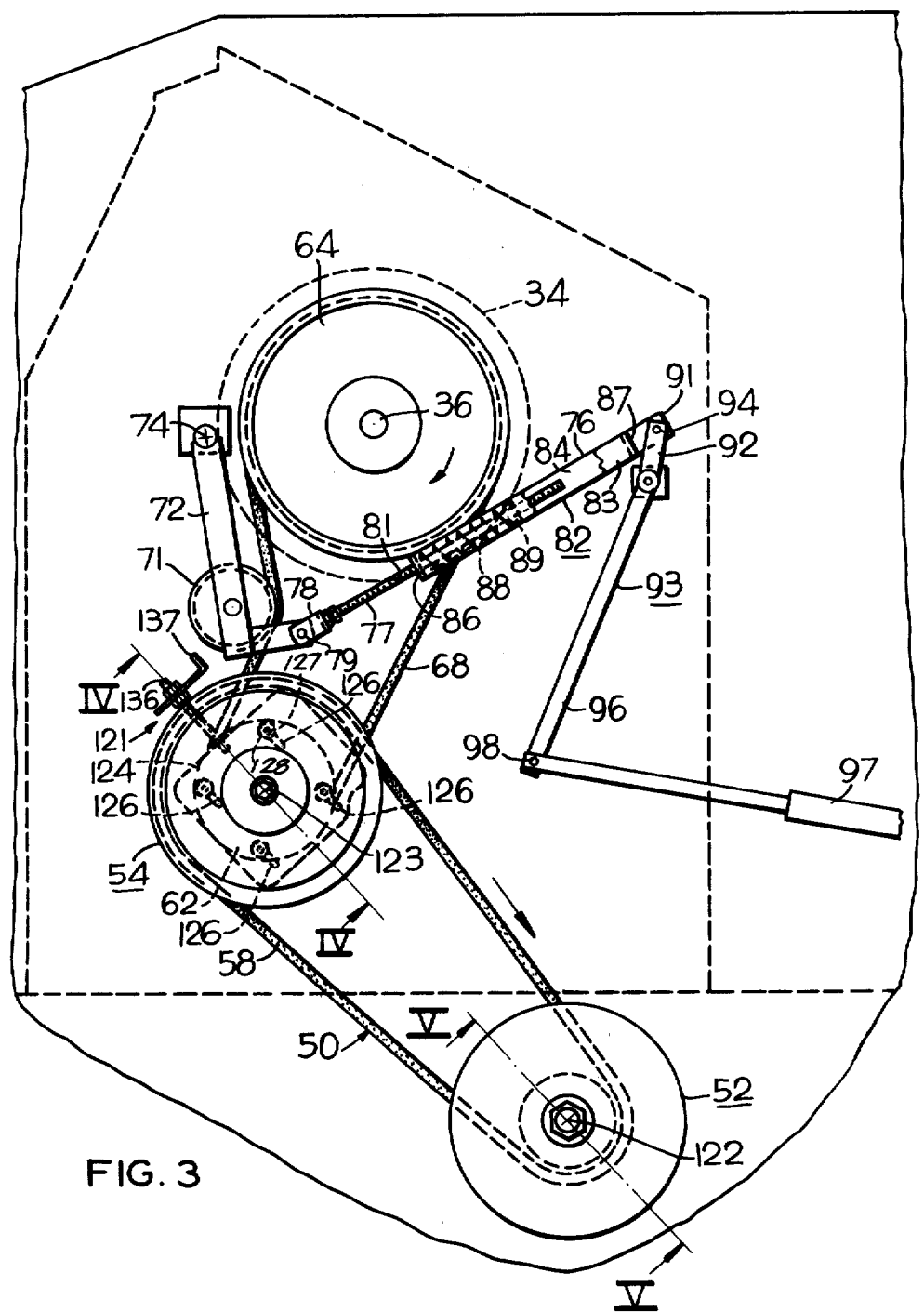
FIG. 3 is an enlarged side view of a portion of the combine shown in FIG. 2.
Figure 5:
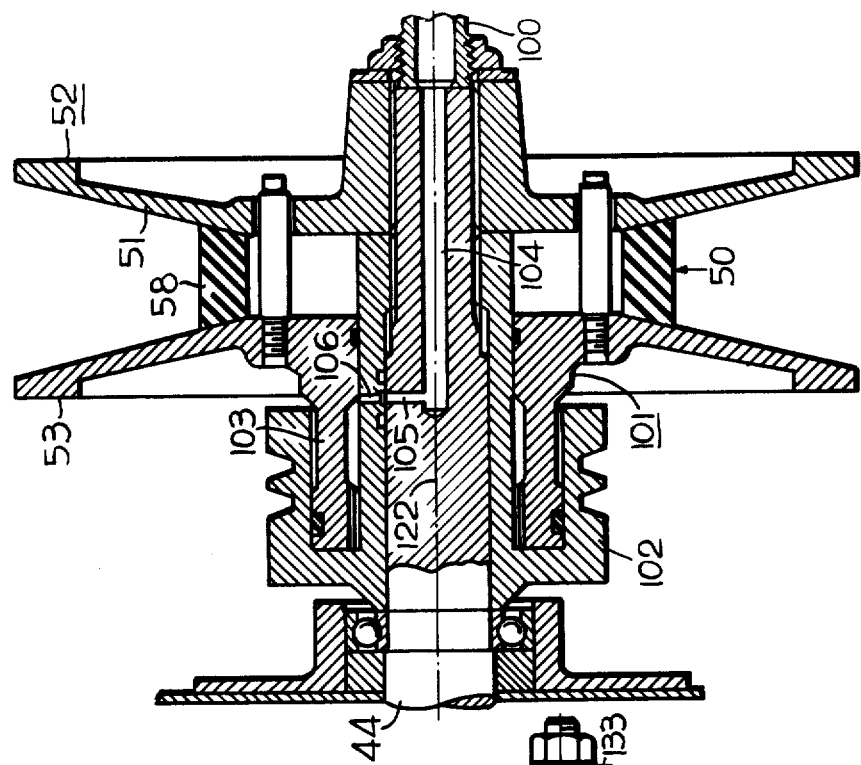
FIG. 5 is a view taken along the line V—V in FIG. 3.

Referring to FIGS. 2, 3 and 5, the transverse shaft 44 is splined at its right end to receive an internally splined sheave half 51 of a variable pitch driving sheave 52. The variable pitch driving sheave 52 is a part of a variable speed belt drive 50, which also includes a variable pitch driven sheave 54 as shown in a section in FIG. 4 and a V-belt 58. The endless drive belt 58 operatively engages the tapered confronting faces of the sheave halves 56, 57 of th edriven sheave 54 and the sheave halves 51, 53 of the driving sheave 52. The drive means for the rotor 34 includes a belt drive between the driven sheave 54 and the rotor shaft 36 which, as shown in FIGS. 2, 3 and 4, includes a pulley 62 secured concentrically to the non-shiftable sheave half 57 of driven sheave 54, a pulley 64 secured in concentric relation to the right-hand end of the rotor shaft 36, and a plurality of V-belts 68 in cooperative engagement with complementary grooves in the pulleys 62, 64.

The belts 68 are tensioned by a combined belt idler clutch and belt tensioning means in the form of an idler pulley 71 rotatably mounted on an arm 72 near its lower end. The upper end of the arm 72 is pivotally supported on the combine for rotation about a transverse pivot axis 74. As shown in FIG. 3, the idler 71 of the idler pulley clutch is held against the backsides of the belts 68 by a resilient belt tensioning means in the form of a spring-loaded link 76, which includes a first part 77 having a clevis 78 pivotally connected to the arm 72 by a pivot pin 79 and a threaded rod 81 extending through an opening at one end of a rectangular segment 82, which includes a pair of spaced side plate 83, 84 and end plates 86, 87. The threaded rod 81 extends through a compression coil spring 88 disposed between sidewalls 83, 84 of segment 82 and a nut 89 is in adjustable threaded engagement with the threaded rod and in abutment with an end of the coil spring 88. A flange 91 secured to end plate 87 is pivotally connected to a short arm 92 of a lever 93 by a pivot pin 94. A long 96 of the lever 93 is pivotally connected to one end of a linear fluid actuator in the form of a hydraulic actuator 97 by a pivot pin 98. The other end of the hydraulic actuator 97 is pivotally connected to the combine by a pivot pin 99.

The variable speed belt drive 50 is caused to change its output speed by power means in the form of a hydraulic actuator 101 which includes a combined V-belt pulley and cylinder 102 and a piston part 103 of the sheave half 53. Pressure fluid is transmitted to the actuator 101 by way of a conduit 100 and interior passages 104, 105, 106 in the shaft 44 and cylinder 102. The variable speed belt drive 50 can only be shifted to a different speed setting while the belt is running. However, with the belt running, extension of the actuator 101 causes the belt 58 to move radially outward on sheave halves 52, 53 and the belt 58 will move inwardly on sheave halves 56, 57 in opposition to the spring 111 and the axial thrust of interengaging cam fingers 112, 113. This results in a smaller effective diameter in the driven sheave 54 and a larger effective diameter in the drive sheave 52, thereby achieving a lower output speed and increased torque to the belts 68 driving the threshing rotor 34. Contraction of the actuator 101, while the variable speed belt drive 50 is running, will cause the drive 50 to adjust to the high output speed condition illustrated in the drawings.

Figure 4:
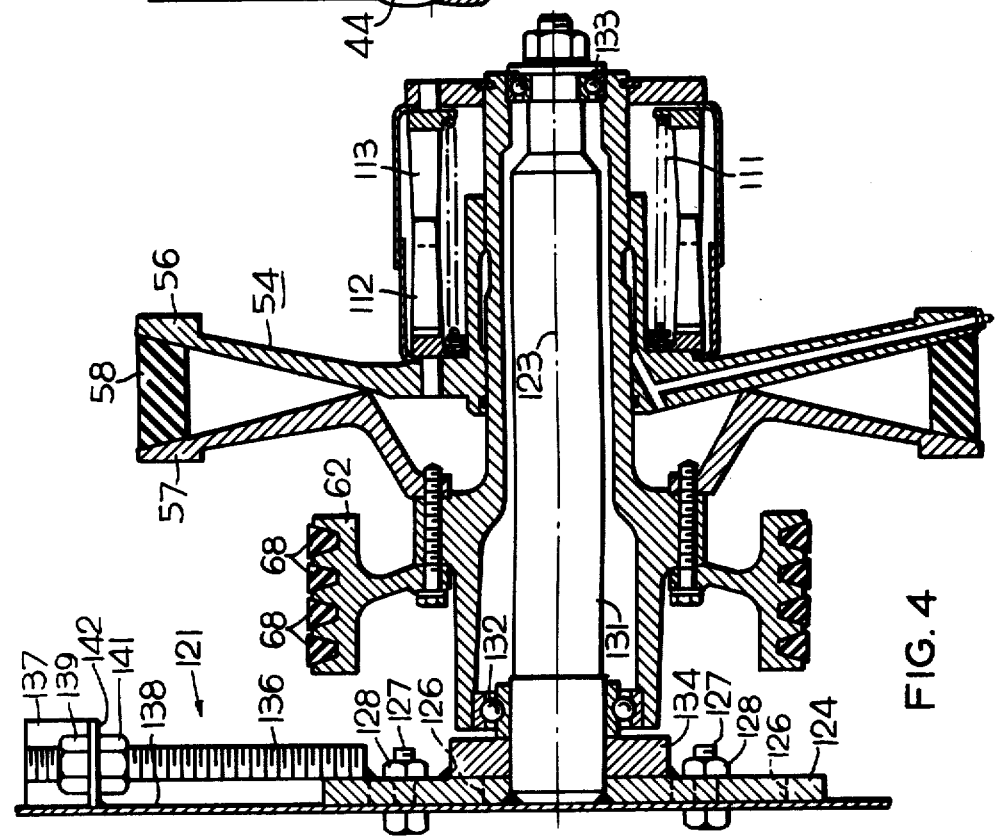
FIG. 4 is a view taken along the line IV—IV in FIG. 3.

As shown in FIGS. 3 and 4, an adjustment means 121 is provided to adjust the distance between the parallel axes 122, 123 of the driving and driven sheaves 52, 54 of the variable speed belt drive 50. The adjustment means 121 includes a mounting plate 124 with four slots 126 elongated in the direction of adjustment, that is, parallel to a plane through the axes 122, 123. Four bolts 127 and nuts 128 releasably secure the plate 124 to the combine sidewall 138. A stationary support shaft 131, supporting sheave half 57 through bearings 132, 133, is welded at its inboard end to the adjustable mounting plate 124 and a collar 134 is welded to the plate 124 to provide additional support for the shaft 131. The lower end of a threaded rod 136 is welded to the plate 124 and its upper end is adjustably secured to a bracket 137. The bracket is welded to the combine sidewall 138 and nuts 139, 141 on abutting opposite sides of a laterally extending flange 142 of the bracket 137 may be adjusted to change the spacing between the axes 122, 123 so as to properly tension the V-belt 58.

OPERATION

During a harvesting operation, crop material removed by the header 24 is conveyed by the lower feeder conveyor 31 to the upper feeder conveyor 32. The upper feeder conveyor 32 moves the crop material to the threshing rotor 34 by way of an opening in the cylindrical perforated cage 37. The rotating speed of the rotor 34 can be adjusted, while the engine 16 is driving the rotor by the operator, operating certain of a plurality of manual control elements or push buttons 143 of an electric control console 145 at the operator's station 23. The control console 145 is connected to an electrohydraulic valve assembly 144 by a multiple lead electric conduit 146. Hydraulic supply and reservoir return conduits 147, 148 from an engine driven pump, not shown, and a fluid reservoir, not shown, are connected to the valve assembly 144 and delivery conduits 100, 151 connect the drive sheave actuator 101 and the idler clutch actuator 97, respectively, to the valve assembly 144. During a harvesting operation, the hydraulic idler clutch actuator 97 is pressurized, causing it to extend to the position shown in FIGS. 2 and 3, wherein the clutch idler pulley is in a drive-establishing condition and the drive belts 68 are resiliently tensioned by the spring 88 in the spring-loaded link 82. The tension of belts 68 can be adjusted by threading the spring-tensioning nut 89 on the threaded rod 81.

If the threshing rotor 34 becomes jammed by excess crop material, the operator is alerted through signaling means such as a shaft monitor, not shown, and he will then stop the forward motion of the combine and disengage the electric clutch 47. When the rotor 34 stops rotating because of a material jam, the electric clutch 47 slips and belts 58 and 68 do not move, that is, they do not run on their associated sheaves and pulleys. Since belt 58 is not moving, it is not possible to adjust the variable speed belt drive 50 to a different ratio to effect a lower output speed and higher torque to the rotor. To remedy this problem, the operator pushes appropriate push buttons 143, at the control console 145, to cause the clutch idler actuator 97 to contract, thus, allowing the idler pulley 71 to move to its nondriving position in which the tension of belts 68 is sufficiently relaxed to permit the belts 68 to slip. Now the variable speed belt drive 50 can be run and its ratio changed by extending actuator 101. The operator may now reengage the idler pulley clutch and the electric clutch 47 to attempt to rotate the rotor 34 with the higher driving torque delivered to the rotor. Quite often a jammed rotor can be rotated by delivery of higher torque, thus, avoiding the time consuming and tedious manual removal of the jammed crop material.

The embodiments of the invention in which an exclusive property or privilege is claimed are defined as follows:

1. In a combine harvester having a wheeled frame supporting an engine, an operator's station, a crop processor with a rotor for threshing crop material, a crop header and a conveyor means for moving crop material from the header to the threshing rotor, the combination comprising:
    a threshing rotor shaft, and
    a drive train connecting said engine in driving relation to said rotor shaft, including
        a first belt pulley on one end of said rotor shaft, a variable speed belt drive, including
  first and second variable pitch sheaves, each with a pair of sheave halves, one of which is axially shiftable relative to the other to change the effective diameter of said sheaves between predetermined large and small diameter conditions, the shiftable sheave half of one of said sheaves being spring biased axially toward its large diameter condition,
  an actuator operable to axially move the shiftable half of the other sheave between its small diameter condition and its large diameter condition, and
  a V-belt operatively engaging said variable pitch sheaves, said one sheave changing from a large diameter condition to a small diameter condition when said actuator changes said other sheave from its small diameter condition to its large diameter condition, the speed ratio of said variable speed belt drive being changeable only when it is running,
a second belt pulley secured to one of sid sheaves to rotate concentrically therewith and said otherbsheave being driven by said engine,
a drive belt operatively engaging said first and second belt pulleys,
an idler clutch pulley engaging said drive belt and being shiftable between a first position, in which said drive belt is not tensioned, and a second position in which said belt is tensioned to provide driving torque to said rotor,
motion transmitting means connected to said clutch pulley for moving the latter between its first and second positions including a manually operable control at said operator's station for selectively operating said motion transmitting means, and control means for said actuator including a manually operable control at said operator's station for actuating said actuator, whereby said rotor may be disconnected from said variable speed belt drive to permit the latter to be driven by said engine and its speed ratio changed to effect a higher output torque.

2. The combination of claim 1 and further comprising a support for said one sheave adjustably mounted on said harvester for movement toward and away from the other sheave and means operable to selectively adjust said support toward or away from said other sheave.

3. The combination of claim 1 wherein said motion transmitting means includes a linear fluid actuator having one end mounted on said combine and a spring-loaded link operatively interposed between the other end of said actuator and said clutch pulley.

4. A wheeled combine powered by an engine characterized by
  a rotatable threshing rotor including a belt pulley secured concentrically to one end thereof, and
  a drive train connecting said rotor in driven relation to said engine, including
    a variable speed belt drive having a pair of adjustable pitch sheaves, one of which is in driven relation to said engine,
    a belt pulley connected in driven relation to the other of said sheaves,
    an endless belt operatively engaging said pulley, and
    an idler clutch including an idler pulley in operative engagement with said endless belt, said idler pulley being shiftable between belt tensioned and belt relaxed positions, whereby said rotor may be disconnected from said variable speed belt drive to permit the latter to be driven by said engine and its speed ratio changed to effect a higher output torque.

* * * * *